(12) United States Patent
Sokol et al.

(10) Patent No.: US 6,756,104 B2
(45) Date of Patent: Jun. 29, 2004

(54) SURFACE FINISHES ON LASER RODS AND SLABS FOR LASER PEENING SYSTEMS

(75) Inventors: David Sokol, Dublin, OH (US); Jeff Dulaney, Dublin, OH (US); Steven M. Toller, Grove City, OH (US)

(73) Assignee: LSP Technologies, Inc., Dublin, OH (US)

( * ) Notice: Subject to any disclaimer, the term of this patent is extended or adjusted under 35 U.S.C. 154(b) by 0 days.

(21) Appl. No.: 10/118,423

(22) Filed: Apr. 8, 2002

(65) Prior Publication Data

US 2002/0110348 A1 Aug. 15, 2002

Related U.S. Application Data

(63) Continuation of application No. 09/063,663, filed on Apr. 21, 1998, now abandoned.

(51) Int. Cl.[7] .................................................. G02B 6/00
(52) U.S. Cl. ....................... 428/141; 385/141; 428/398; 65/429; 65/392; 266/249; 219/121.6; 252/301.6 P
(58) Field of Search .................................. 428/141, 398; 385/141; 65/429, 392; 266/249; 219/121.6; 252/301.6 P

(56) References Cited

U.S. PATENT DOCUMENTS

| | | | |
|---|---|---|---|
| 3,982,917 | A | 9/1976 | Upton |
| 4,816,049 | A | 3/1989 | Hata et al. |
| 5,053,165 | A | 10/1991 | Toratani et al. |

FOREIGN PATENT DOCUMENTS

| JP | 62-017045 | 1/1987 | ........... C03C/17/02 |
|---|---|---|---|

*Primary Examiner*—William P. Watkins, III
(74) *Attorney, Agent, or Firm*—Randall J. Knuth

(57) ABSTRACT

A laser gain medium and a method of manufacturing a laser medium, such as a laser rod, or slab for use in high-powered laser peening systems. A laser medium and method reduces stress risers along the surface of the amplifier medium by grit blasting, polishing, etching, annealing, and by eliminating platinum inclusions within the laser glass.

19 Claims, 3 Drawing Sheets

SURFACE FINISHES ON LASER RODS AND SLABS FOR LASER PEENING SYSTEMS

This is a continuation of patent application Ser. No. 09/063,663, filed on Apr. 21, 1998, now abandoned the disclosure of which is herein explicitly incorporated by reference.

BACKGROUND OF THE INVENTION

1. Field of the Invention

The present invention relates to the use of coherent energy pulses as from high-power pulsed lasers in the shock processing of solid materials, and more particularly to a laser rod or slab and method of improving the same for generating more frequent laser pulses in laser peening systems.

2. Description of the Related Art

Known methods for the shock processing of solid materials, particularly known methods for the laser shock processing of solid materials, typically use coherent energy from a laser beam oriented near normal to a workpiece.

Typical laser shock processing techniques and equipment can be found in U.S. Pat. No. 5,131,957 to Epstein.

An operational effect and use of such laser shock processing systems is that to decrease operational costs, there is a necessity to generate more laser pulses per unit of time. In order to accomplish this goal, it is necessary to fire the laser flash lamps more frequently, thereby putting forth more heat into the Nd glass gain medium of the laser amplifiers. The convectively cooled medium develops thermal gradients which cause surface tensile stresses. These stresses are intensified at flaws along the surface of the Nd glass medium, and therefor cause fracture of the medium. An illustration of surface flaws in a glass rod is shown in FIG. 1.

Particular flaws in such laser rods include the natural surface finish and manufacturing accidents, such as accidentally bumping the edge of the glass medium or improper fixation of the medium during cutting, or other manufacturing steps. Such flaws act as stress risers along the surface of the amplifier laser rod or slab causing, at that location, a crack to initiate.

What is needed in the art is a laser rod or slab which may prove to have an ability to withstand thermal stress of use by reducing the flaws on a surface finish of amplifier rods and slabs.

SUMMARY OF THE INVENTION

The present invention comprises a laser rod or slab and method of manufacturing of the laser rod or slab for use in a laser peening system. Generally, the concept revolves around reducing the stress risers along the surface of the amplifier laser rods or slabs.

The invention, in one form thereof, is a laser peening system comprising a phosphate glass laser amplifier rod or slab, having an absence of surface defects larger than about 50 $\mu$m, whereby the surface finish permits the laser peening system to operate at a rate of at least two peening operation per second.

The invention, in another form thereof, provides a laser peening system as described above, in which the laser rod or slab is operated in excess of 20 watts per centimeter average power.

The invention, in another form thereof, provides a phosphate glass laser amplifier rod or slab having substantially no platinum inclusions therein.

An advantage of the present invention, is that by reduction of the surface flaws, an increase in the repetition rate of the laser system is possible, thereby reducing the costs of laser peening.

Another advantage of the present invention is that by reducing surface flaws, the laser rod or slab of the present invention has a reduced chance of cracking as it is utilized.

A further advantage of the invention is that by utilization of the present method, a change in the stress concentration of the laser rod or slab is created so that the concentration is more even, thereby blunting stress risers which may cause crack initiation.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

The exemplification set out herein illustrates one preferred embodiment of the invention, in one form, and such exemplification is not to be construed as limiting the scope of the invention in any manner.

DETAILED DESCRIPTION OF THE INVENTION

The rate at which material can be treated according to the present invention is approximately proportional to the average power of the radiation pulses that produce the shock waves, provided each individual pulse has enough energy to exceed a particular threshold. We have found that the rate of production according to the invention can be increased approximately four fold by using a recently developed type of high-average-power (HAP) phosphate-laser-glass in the typical laser amplifier that delivers the radiation pulses to a target workpiece At first, it may seem obvious to use HAP glass in this manner. However, HAP laser glasses have been available for more than a decade without finding widespread use in laser systems requiring the combination of high pulse energy and high average power. HAP glass has a fracture resistance higher than traditional glasses due to its larger fracture toughness, but this advantage is significantly reduced by the presence of surface flaws. Furthermore, there has been no use of laser glass surface flaws. Furthermore, there has been no use of laser glass of the particular size of the present invention for laser peening. The present invention particularly relates only to amplifier laser rods larger than 20 mm in diameter and slabs with surfaces larger than 5 cm by 20 cm.

As used in this application the terms abrade, abrading, and abrasion refer to the mechanical removal of material by mechanical techniques such as loose abrasive grinding, fixed abrasive grinding, lathe turning, fly cutting, and any other standard machining technique that removes material and shapes a glass rod or slab into its final form.

A fracture resistant laser gain medium can be achieved by reducing the depth of flaws in the surface of the medium. This can be accomplished during the fabrication stage of the gain medium by employing the following steps:

- rough forming the laser gain medium from a bar by hard grinding,
- additional material removal by a grit fixed abrasive,
- additional material removal by a series of grit loose abrasives,
- smoothing by polishing, and
- final smoothing by etching.

Annealing, flame annealing, or $CO_2$ annealing can be combined with the etching or substituted for this step. As a result of the process, flaw depths are reduced to less than 50 $\mu$m. FIG. 2 shows a before and after view of a slab surface.

Figure 1:
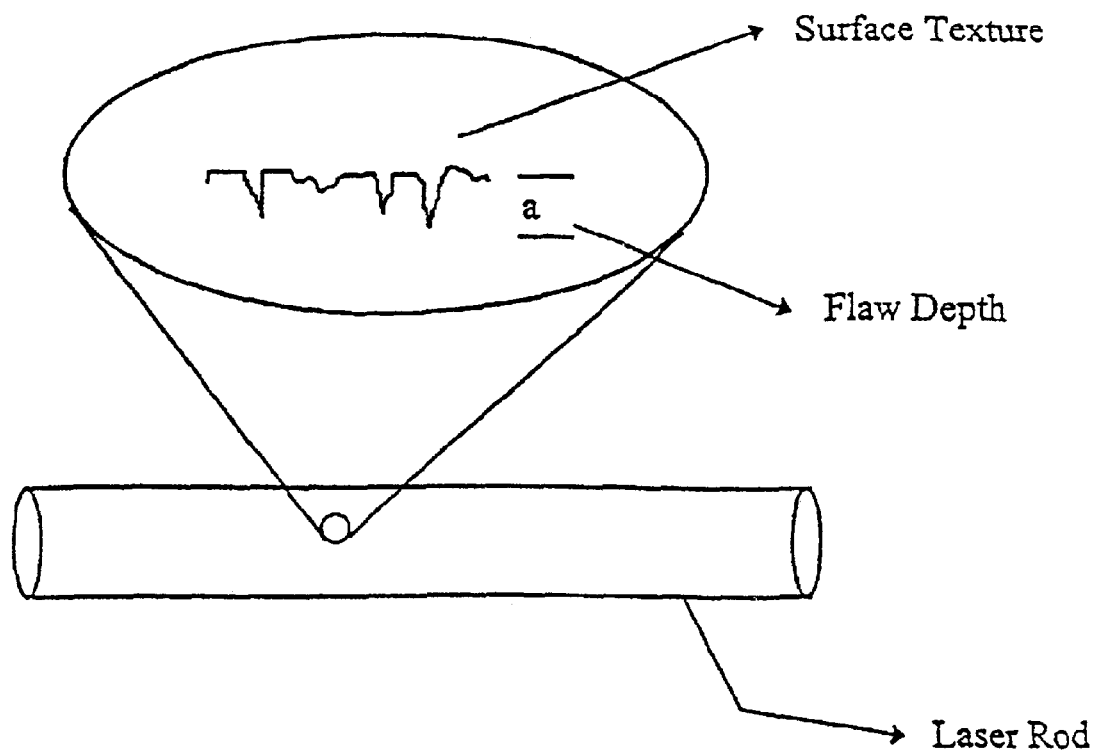
FIG. 1 is a schematic view of surface flaws in a rod laser medium, where a is the depth of the flaw.
Figure 2A:
FIG. 2A is a diagrammatic view of laser media before treatment with the invention.

FIG. 2A is a side view of surface flaws in an untreated slab gain medium. The parameter "a" is a measure of the depth of the flaw. In this case the flaw depth "a" is greater than 50 $\mu$m.

Figure 2B:
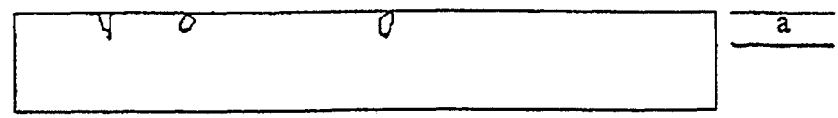
FIG. 2B is a diagrammatic view of laser media after treatment with the invention.
Figure 3:
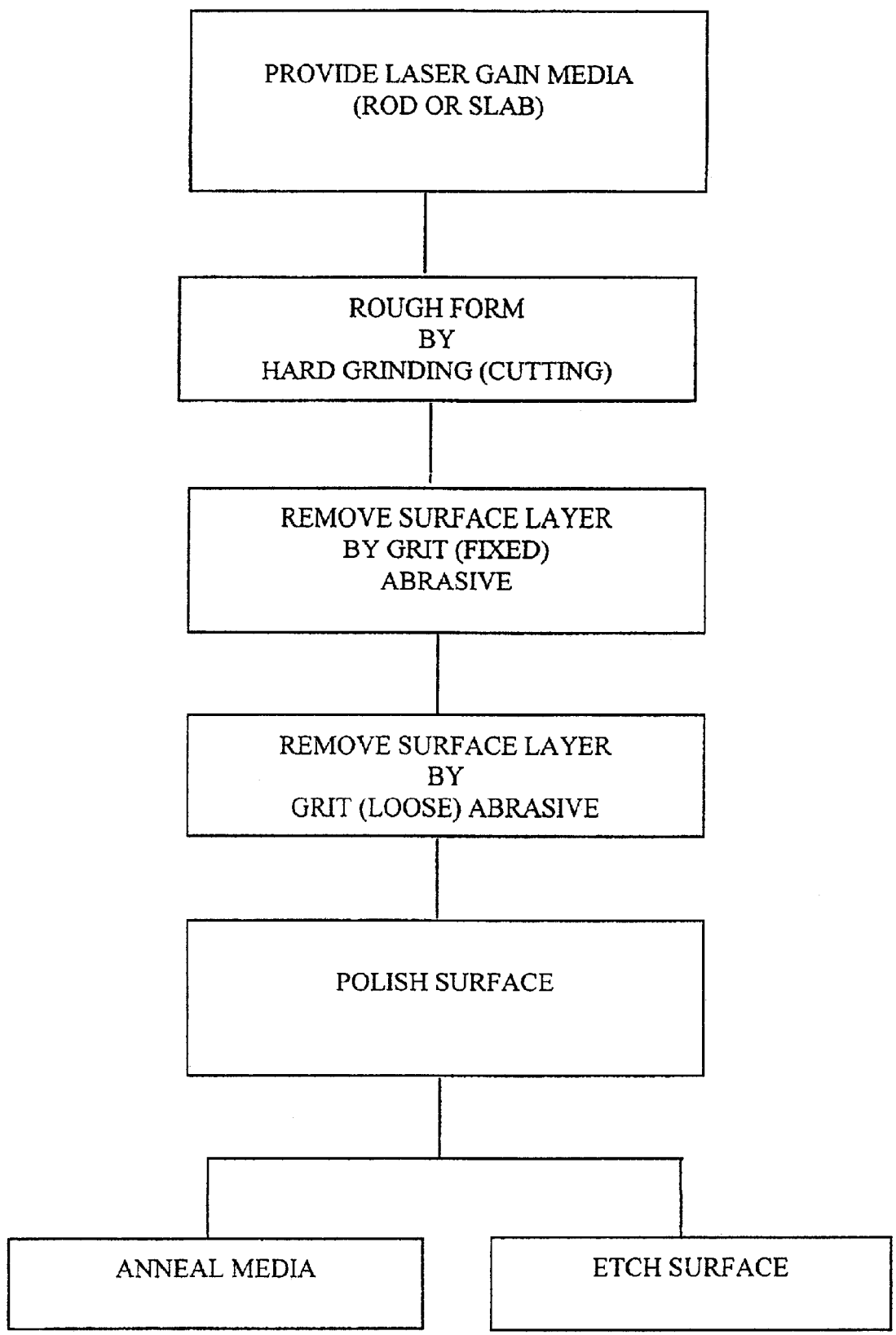
FIG. 3 is a flow chart of one embodiment of the method of the present invention.

FIG. 2B is a side view of surface flaws in a treated slab gain medium. Now the surface flaws are less then 50 $\mu$m in depth. Drawings are not to scale.

The method utilized in the present invention to create the laser amplifier medium is that of first forming a piece of laser glass media into a substantial cylindrical rod shape or rectangular slab shape as known the art. Typical forming is accomplished by cutting or sawing a rough laser rod or slab shape from a piece of bulk laser glass.

The present application is that the active medium of the laser amplifier needs to have a rod shape having a cylindrical surface with an end surface having a diameter at least 20 millimeters or a slab shape with a rectangular surface of at least 5 cm by 20 cm, but preferably larger. Such large sizes of laser gain medium have historically had a number of different problems, in particular that of not withstanding continued use in a laser peening system.

After the piece of laser glass is formed to a particular shape desired, the outer cylindrical surfaces or rectangular surface and end surfaces may be ground roughly to shape with a Landis grinding tool. Such use of a grit fixed abrasive method is utilized in the art.

Particular embodiments of the invention include using one, a plurality, or all of the particular surface finishing method steps described herein. After forming (cutting by hand grinding, i.e., saw) and grinding (with the grit fixed abrasive i.e., grinding wheel) of the laser gain medium, at least one, but preferably more than one of the following auxiliary surface finishing method steps are utilized.

Finishing Method Step: Grit Blasting

In one embodiment of the invention, one of the surface finishing steps may be that of grit blasting the laser rod medium surface decreasing sizes of grit. Grit blasting, is defined as impacting small accelerated particles on the surface of the laser gain medium. Such grit blasting is similar to that of sand blasting in which small particles such as sand, glass beads, walnut shells, silica, or other minute particles are accelerated in a fluid stream such as compressed air. Examples of possible grit blasting particles for use in the present application include: alumina, baking soda, silicon carbide, wheat starch, diamond, boron carbide, aluminum oxide, and other similar materials. Such small particles act to reduce the particular high points along the impacted surface of the laser medium.

Finishing Method Step: Polishing

In another embodiment of the invention, preferably after cutting, grinding, and grit blasting, the laser medium is polished with a particular type of polish. Polishing, as used in this application, refers to the rubbing of a polishing compound over the surface of the laser medium. The polishing compound used will have low levels of metallic impurities. Depending on the type of laser gain medium utilized, the best polishing compound for reducing surface defects may vary. Examples of acceptable polishing compounds include cerium oxide, titanium dioxide, aluminum oxide, and silicon dioxide. For a laser medium constructed of Schott APG-1 Glass the best polishing compound for the present invention is cerium oxide.

Finishing Method Step: Etching

In another form of the invention, an etchant is used to further smooth the surface finish of the surface of the laser medium. Depending upon the type of laser glass used, particular types of etchants are available. Some etchants available for use are acid, while others are base.

Typically, such etching will reduce the surface roughness from between 150 $\mu$m and 100 $\mu$m to less than 10 $\mu$m. Possible etchants for use include: KF, KOH, HF, NaOH, $HNO_3$, and others. KOH and KF has been found to be superior etchants for Schott APG-1 type laser glass.

Finishing Method: Annealing or Flame Polishing

Another effective embodiment of the invention, includes the step of annealing the glass so as to reduce surface defects. Such annealing may be provided by a high ambient temperature, such as conventional heat treating, a localized heat source, or by use of a flame. Such annealing causes the outer surface of the laser medium to melt and potentially seal surface defects on the laser medium surface.

In another similar embodiment, the annealing step may comprise providing a $CO_2$ laser beam or other type of laser beam or localized heat source and scanning such laser beam over the surface to anneal the scanned area. Such use of a laser beam may have advantages that no particular longitudinal stresses may be imparted to the laser medium so treated.

As previously stated, depending upon the particular laser glass medium employed, utilizing one, several, or all of the previous method steps may be needed to efficiently cause a reduction of defects in the surface finish, typically measured by the depth of the flaw.

Such finished laser glass should have an absence of surface defects larger than approximately 50 $\mu$m. It is at this size limitation in the study by the present inventors, that they believe permit the laser peening system, which includes the embedded laser amplifier to operate at approximately at least one laser peening operation every second with an average power greater than 20 watts/cm.

In another form of the invention, a laser peening system includes a laser amplifier as described by any of the various methods or combinations above. Additionally, care taken to reduce and eliminate platinum (Pt) inclusions in the laser glass. This has been effective in reducing the probability of creating hot spots within the laser medium during operation.

The production of Pt free glass is strongly dependent on the solubility of Pt in phosphate-based glasses. The rate of solubility of Pt is significantly increased when the phosphate glass is melted in a highly oxidized atmosphere. Therefore, the glass medium should be produced in a reducing atmosphere. The hot spots, create uneven heating, and therefore, introduce stress to the laser medium in addition to the particular surface defects. The combination of such reduction of surface defects plus reduction of platinum inclusions has been determined to increase the operational lifetime of the laser glass mediums used in the laser peening systems. For use in this application Pt-free glass, or glass having an absence of platinum inclusions is defined as glass having a cross sectional area of inclusions, with diameters greater than 0.05 mm, less than 0.03 $mm^2$ per 100 $cm^3$ of glass.

Laser Glass

In most laser applications the brightness and coherence of the laser beam are of prime importance, and both of them degrade at high average power to the extent that the laser beam is useless for such applications even before the fracture stress is reached for ordinary unstrengthened glass. Moreover, the silicate glasses that have been available in high-average-power form for many years have such high temperature dependent, coefficients of index of refraction, that the strengthened glasses produce no more average power than do the unstrengthened glasses. Also the coefficient of gain in silicate glass is only about two-thirds that of phosphate glass, making it unsuitable for applications requiring high power. Finally silicate glass can not be made substantially Pt-free.

Heretofore, the main reason for using strengthened glass has been that it is less likely to break during shipping or other handling. The greatly increased rates of production obtainable by using a strengthened phosphate glass amplifier in shock processing according to the present invention were unexpected and far from obvious.

High-average-power phosphate glass has an average power capability approximately four times as great as that of the older phosphate glass. The temperature dependent coefficient of index of refraction tends to cancel the density coefficient and the resultant change in index of refraction with temperature is much lower than for silicate glasses, so it is possible to obtain higher output power, approximately proportional to the greater strength of the glass. Because the present laser peening treatment does not require a radiation beam of high brightness, and because the mixed polarization resulting from stress does not have any adverse effect, the strengthened phosphate glass can provide significant improvements in average power such as to yield much higher rates of production in the laser peening of the present invention.

A laser glass medium that has been used to advantage in practicing the present invention is Schott Glass Technologies' Schott APG-1 strengthened phosphate laser glass. APG-1 is a strengthened phosphate laser glass that combines the high gain and high damage-threshold properties of the phosphate glasses with the high strength and durability characteristics of the silicate glasses. The end result in utilizing this laser material with the above described steps promises to provide a breakthrough in the capability of laser glass to provide high average power at large (greater than 20 mm) rod diameters and for large slab surfaces (greater than 5 cm by 20 cm) for laser peening applications.

No current laser peening systems created or used implements such a laser rod or slab as described, having enough capacity so that reliable and repeatable laser peening operations may take place. Therefore the inventors have determined that a laser gain medium formed as described with surface defects limited to less than 50 $\mu$m sized would be operable to enable a commercially successful laser peening system.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A laser peening system comprising:
   a phosphate glass laser amplifier rod having an outer rod surface and a corresponding outer rod surface finish, said outer rod surface finish permitting surface defects only no larger than about 50 $\mu$m to remain, said outer rod surface finish thereby allowing the laser peening system to operate at a rate of at least one peening operation per second, said outer rod surface finish being achieved upon only at least one of annealing and etching outer said rod surface after mechanical treatment thereof, thereby resulting in a finsihed, operable said phosphate glass amplifier rod.

2. The laser peening system of claim 1 in which said laser rod is formed from high-average-power phosphate glass.

3. The laser peening system of claim 1 in which said laser rod is operated in excess of approximately 20 watts/cm average power.

4. The laser peening system of claim 1 in which laser rod has been etched by an etching solution.

5. The laser peening system of claim 1 in which said etching solution is acidic.

6. The laser peening system of claim 1 in which said etching solution is alkaline.

7. The laser peening system of claim 1 in which said phosphate glass laser amplifier rod has an absence of platinum inclusions therein.

8. The laser peening system of claim 1 in which said laser rod is capable of withstanding at least five times the power per unit length than typical phosphate glass is capable of withstanding.

9. The laser peening system of claim 1 in which said laser rod is sized larger than 20 mm in diameter.

10. A laser peening system comprising:
    a phosphate glass laser amplifier slab having an outer slab surface and a corresponding outer slab surface finish, said outer slab surface finish permitting surface defects only no larger than about 50 $\mu$m to remain, said outer slab surface finish thereby allowing the laser peening system to operate at a rate of at least two peening operations per second, said outer slab surface finish being achieved upon only at least one of annealing and etching said outer slab surface after mechanical treatment thereof, thereby resulting in a finished, operable said phosphate glass laser amplifier slab.

11. The laser peening system of claim 10 in which said laser slab is formed from high-average-power phosphate glass.

12. The laser peening system of claim 11 in which laser slab has been etched by an etching solution.

13. The laser peening system of claims 12 in which said etching solution is acidic.

14. The laser peening system of claim 12 in which said etching solution is alkaline.

15. The laser peening system of claim 10 in which said phosphate glass laser amplifier slab has an absence of platinum inclusions therein.

16. The laser peening system of claim 10 in which said laser slab is capable of withstanding at least four times the power per unit length that typical phosphate glass is capable of withstanding.

17. The laser peening system of claim 10 in which said laser slab is sized larger than 20 cm in length and 5 cm in width.

18. The laser peening system of claim 1, in which the mechanical treatment includes at least one of abrading and polishing said outer rod surface.

19. The laser peening system of claim 10, in which the mechanical treatment includes at least one of abrading and polishing said outer rod surface.

* * * * *